(12) United States Patent
Blosser et al.

(10) Patent No.: US 6,769,606 B1
(45) Date of Patent: Aug. 3, 2004

(54) AUTOMATED TELLER MACHINE PRINTER SYSTEM AND METHOD

(75) Inventors: Lyle P. Blosser, Louisville, OH (US); Bruce G. Richards, North Canton, OH (US); Dana Walters, North Canton, OH (US); Kathleen King, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 10/266,122

(22) Filed: Oct. 7, 2002

Related U.S. Application Data
(60) Provisional application No. 60/328,394, filed on Oct. 9, 2001.

(51) Int. Cl.[7] ............................................. G06F 17/60
(52) U.S. Cl. ......................................... 235/379; 705/24
(58) Field of Search ...................... 235/375, 379–382; 705/24, 16, 17, 43; 902/8–22, 24, 36

(56) References Cited

U.S. PATENT DOCUMENTS

| | | | |
|---|---|---|---|
| 5,081,579 A | * | 1/1992 | Komai et al. ................. 705/24 |
| 5,336,870 A | * | 8/1994 | Hughes et al. ............... 235/379 |
| 5,686,713 A | * | 11/1997 | Rivera ......................... 235/380 |
| 6,145,740 A | * | 11/2000 | Molano et al. .............. 235/380 |

* cited by examiner

*Primary Examiner*—Michael G. Lee
*Assistant Examiner*—Jamara A. Franklin
(74) *Attorney, Agent, or Firm*—Christopher L. Parmelee; Ralph E. Jocke; Walker & Jocke

(57) ABSTRACT

An automated banking machine (10) with customizable transaction receipts is provided. The automated banking machine may include a computer (30), at least one printer device (24, 44, 46), at least one input device (14, 16, 32) and at least one transaction function device (20, 22, 26, 36). The machine may be in communication with a further computer (37) which includes a data store (38) with document templates (42) stored therein. Each of the document templates may be associated with template attributes (48). A document template from the data store may be selected responsive to at least one characteristic of: a printer device of the machine, a consumer using the machine, and/or a transaction function being performed at the machine. The machine may generate and print one or more documents using one or more printer devices of the machine responsive to the document template and the transaction function.

42 Claims, 15 Drawing Sheets

Header Template in XML

```
[1]   <hdr>
[2]   <dest>B</dest>
[3]   <token id='001' len='16' align='L' mask='%m/%d/%y__%H:%M' label=" lpos='L'/>
[4]   <token id='017' len='03' align='R' mask=" label=" lpos='L'/>
[5]   <cntl id='01' cnt='2' data="/>
[6]   <token id='026' len='20' align='L' mask=" label=" lpos='L'/>
[7]   <cntl id='01' cnt='1' data="/>
[8]   <token id='027' len='17' align='L' mask=" label=" lpos='L'/>
[9]   <token id='028' len='02' align='L' mask=" label=" lpos='L'/>
[10]  <cntl id='01' cnt='2' data="/>
[11]  <dest>C</dest>
[12]  <token id='015' len='20' align='L' mask=" label=" lpos='L'/>
[13]  <dest>A</dest>
[14]  <token id='013' len='20' align='L' mask=" label=" lpos='L'/>
[15]  <dest>B</dest>
[16]  <cntl id='01' cnt='1' data="/>
[17]  <token id='002' len='08' align='L' mask='%m/%d/%y' label=" lpos='L'/>
      </hdr>
```

Detail Template in XML

```
[1]   <det>
[2]   <dest>B</dest>
[3]   <cntl id='01' cnt='1' data="/>
[4]   <token id='010' len='05' align='L' mask=" label=" lpos='L'/>
[5]   <cntl id='03' cnt='1' data='3' />
[6]   <cond id='04' data='000'>
[7]   <text>*</text>
[8]   </cond>
[9]   <cond id='03' data='000'>
[10]  <text>_</text>
[11]  </cond>
[12]  <token id='016' len='04' align='R' mask=" label=" lpos='L'/>
[13]  <token id='006' len='08' align='L' mask='%C' label=" lpos='L'/>
[14]  <cntl id='01' cnt='1' data="/>
[15]  <cond id='01' data='031' >
[16]  <text>Avail_Bal</text>
[17]  <token id='031' len='11' align='L' mask='%C' label=" lpos='L'/>
[18]  <cntl id='01' cnt='1' data="/>
[19]  </cond>
[20]  <cond id='01' data='032' >
[21]  <text>Curr_Bal</text>
[22]  <token id='032' len='12' align='L' mask='%C' label=" lpos='L'/>
[23]  <cntl id='01' cnt='1' data="/>
[24]  </cond>
[25]  <cond id='07' data='000'>
[26]  <text>Term_Fee</text>
[27]  <token id='007' len='12' align='L' mask='%C' label=" lpos='L'/>
[28]  <cntl id='01' cnt='1' data="/>
[29]  <text>Tran_Total</text>
[30]  <token id='008' len='07' align='L' mask='%C' label=" lpos='L'/>
[31]  <cntl id='01' cnt='1' data="/>
[32]  </cond>
      </det>
```

Trailer Template in XML

```
[1]   <trlr>
[2]   <dest>C</dest>
[3]   <token id='018' len='20' align='L' mask=" label=" lpos='L'/>
[4]   <token id='019' len='20' align='L' mask=" label=" lpos='L'/>
[5]   <token id='020' len='20' align='L' mask=" label=" lpos='L'/>
[6]   <cntl id='02' cnt='1' data=" />
[7]   </trlr>
```

Fig 3

| Tag | Description |
| --- | --- |
| <token> | Specifies a pre-defined data element is to be used |
| <text> | Specifies fixed text is to be inserted |
| <dest> | Specifies a print destination is to be used |
| <cntl> | Specifies a control sequence is to be inserted |
| <cond> | Specifies the start of a condition definition |
| <hdr> | Specifies the start of the print data header data |
| <det> | Specifies the start of the print data detail data |
| <trlr> | Specifies the start of the print data trailer data |
| <dep> | Specifies the start of the depository print data |
| <scr> | Specifies the start of the screen print data |

80 

Fig. 5

| Properties | Description | Values |
|---|---|---|
| id | Specifies the identifier of the pre-defined data element | A number elected from a list of valid identifiers |
| len | Specifies a length to override the default element length | An integer |
| align | Specifies the alignment of the data element | L (left), R (right), C (center) |
| mask | Specifies format instructions for the data element | A stream of characters with special notation (refer to section on formatting for details on this notation) |
| label | Specifies a label to be associated with the data element | A stream of characters |
| lpos | Specifies the positioning of the label in relation to the data element | L (to left of data), R (to right of data) |

| id | Description | id | Description |
|---|---|---|---|
| 1 | Transaction Date and Time | 2 | Business Date |
| 3 | Requested Amount | 4 | Requested Fee |
| 5 | Requested (Amount plus Fee) | 6 | Completed Amount |
| 7 | Completed Fee | 8 | Completed (Amount plus Fee) |
| 9 | Transaction Code | 10 | Host Transaction Code |
| 11 | From (Debited) Account | 12 | To (Credited) Account |
| 13 | PAN | 14 | Member Number |
| 15 | Suppressed PAN | 16 | Serial Number |
| 17 | Terminal Id | 18 | Courtesy Line 1 |
| 19 | Courtesy Line 2 | 20 | Courtesy Line 3 |
| 21 | Descriptor Line 1 | 22 | Descriptor Line 2 |
| 23 | Header Screen 1 | 24 | Header Screen 2 |
| 25 | Header Screen 3 | 26 | Terminal Location: Street |
| 27 | Terminal Location: City | 28 | Terminal Location: State |
| 29 | Acquirer Bank Name | 30 | Issuer - Bank Name |
| 31 | Available Balance | 32 | Ledger Balance |
| 33 | Lesser Amount | 34 | Initial Note Count 1 |
| 35 | Initial Note Count 2 | 36 | Initial Note Count 3 |
| 37 | Initial Note Count 4 | 38 | Dispensed Note Count 1 |
| 39 | Dispensed Note Count 2 | 40 | Dispensed Note Count 3 |
| 41 | Dispensed Note Count 4 | 42 | Envelope Count |
| 43 | Transaction Count | 44 | Retained Card Count |
| 45 | Statement Data | 46 | Buffer A |
| 47 | Buffer B | | |

| id | Description | id | Description |
|---|---|---|---|
| 49 | Transaction Text (Long) | 50 | Transaction Text (Short) |
| 51 | Transaction Text (From) | 52 | Transaction Text (To) |
| 53 | Denial Text | 54 | Denial Code |
| 55 | Transaction Currency Text | 56 | Data from User Exit 3 |
| 57 | Initial Coin Count 1 | 58 | Initial Coin Count 2 |
| 59 | Initial Coin Count 3 | 60 | Initial Coin Count 4 |
| 61 | Dispensed Coin Count 1 | 62 | Dispensed Coin Count 2 |
| 63 | Dispensed Coin Count 3 | 64 | Dispensed Coin Count 4 |
| 65 | Postal Code | 66 | County Code |
| 67 | Country Code | 68 | Transaction time stamp (adjusted terminal's time zone) |
| 69 | Least Multiple | 70 | Posted Amount |
| 71 | Posted Fee | 72 | Posted Amount plus Fee |
| 73 | Primary Track | 74 | Track 1 |
| 75 | ISO Currency Code Override | 76 | Currency Conversion Rate |
| 77 | Completion Code | 78 | Discretionary Data |
| 79 | Network Trace Number | 80 | Original Network Trace Number |
| 81 | Remote Terminal Id | 82 | Network Time and Date |
| 83 | Reversal Reason Code | 84 | Network Denial Code |
| 85 | Audit Index | 86 | Audit Count |
| 87 | Audit Amount | | |

Fig. 7

| Code | Description |
|---|---|
| %a | Abbreviated weekday name |
| %A | Full weekday name |
| %b | Abbreviated month name |
| %B | Full month name |
| %c | Local date and time representation |
| %d | Day of the month (01-31) |
| %H | Hour (24-hour clock) (00-23) |
| %I | Hour (12-hour clock) (01-12) |
| %j | Day of the year (001-366) |
| %m | Month (01-12) |
| %M | Minute (00-59) |
| %p | Local equivalent of AM or PM |
| %S | Second (00-61) |
| %U | Week number of the year (Sunday as 1st day) (00-53) |
| %w | Weekday (0-6, Sunday is 0) |
| %W | Week number of the year (Monday as 1st day) (00-53) |
| %x | Local date representation |
| %X | Local time representation |
| %y | Year without century (00-99) |
| %Y | Year with century |
| %Z | Time zone name, if any |
| %% | % |

Fig. 8

| Code | Description |
|---|---|
| c0 | Use system base currency formatting rules as specified in the ISO 4217 currency code table, but with no currency symbols<br>Ex: 1,234.99 for US; 1.234,99 for France, etc. |
| C0 | Use system base currency formatting rules as specified in the ISO 4217 currency code table, with appropriate currency symbols<br>Ex: $1,234.99 for US, 1.234,99 F for France, etc. |
| c1 | Use transaction-specified currency formatting rules as specified in the ISO 4217 currency code table, but with no currency symbols<br>Ex: $1,234.99 for US, 1.234,99 for France, etc. |
| C1 | Use transaction-specified currency formatting rules as specified in the ISO 4217 currency code table, with appropriate currency symbols<br>Ex: $1,234.99 for US, 1.234,99 F for France, etc. |
| z | Zero-suppressed numeric, no separators<br>EX: zzzz9 |
| Z0 | Zero-suppressed numeric, with separators. Use system base currency formatting rules as specified in the ISO 4217 currency code table to determine separator character<br>Ex: zz.zz9 for US, zz.zz9 for France, etc. |
| Z1 | Zero-suppressed numeric, with separators. Use transaction-specified currency formatting rules as specified in the ISO 4217 currency code table to determine separator character<br>Ex: zz,zz9 for US, zz.zz9 for France, etc. |
| n | Numeric, no zero-suppression, no separators<br>Ex: 99999 |
| N0 | Numeric, no zero-suppression, separators. Use system base currency formatting rules as specified in the ISO 4217 currency code table to determine separator character<br>Ex: 99,999 for US, 99.999 for France, etc. |
| N1 | Numeric, no zero-suppression, separators. Use transaction-specified currency formatting rules as specified in the ISO 4217 currency code table to determine separator character<br>Ex: 99,999 for US, 99.999 for France, etc. |

Fig. 9

| Control ID | Description | Name |
|---|---|---|
| 01 | Prints a line, then does a carriage return and line feed | Line feed |
| 02 | For paper with a TOF mark, advances to TOF mark, then cuts and delivers the form. For blank paper, does one or more line feeds (depending on the PRT DIT settings), then cuts and delivers the form. | Form Feed |
| 03 | Fills an area with space characters; the character following SO defines the number of spaces. Range is ASCII 31-3F (decimal 1-15). | Space Fill |
| 04 | Prints a line of characters, does a carriage return | Return |
| 05 | Selects the alternate character set for one character | Alt Char |
| 06 | An escape character; used to construct a number of control sequences in combination with additional data. Some examples of using additional data:<br>I027 - insert screen 027<br>U0 - enable underline printing<br>U1 - disable underline printing | Escape |
| 07 | Inserts a field separator character in the print data (x'1c') | Field sep |
| 08 | Inserts a group separator character in the print data (x'1d') | Group sep |
| 09 | Inserts a record separator character in the print data (x'1e') | Record Sep |
| 10 | performs a destructive backspace operation on terminal screens | Backspace |
| 11 | clears the current contents of a terminal screen | Clear Screen |
| 12 | displays the name data encoded on track 1 of a consumer's card | Track 1 Name |
| 13 | Used to position the cursor on a screen in preparation for writing text or inserting a graphic | Position Cursor |
| 14 | inserts another screen at the current location. This differs from the example shown using escape sequences; it inserts a x'0e' code instead of the escape's x'1b'. | Insert Screen |

Fig. 10

| Condition Code | Description |
| --- | --- |
| 01 | Element (identified in data attribute) is present |
| 02 | Element (identified in data attribute) is not present |
| 03 | Transaction was authorized online |
| 04 | Transaction was authorized offline (via stand-in) |
| 05 | Transaction is proprietary |
| 05 | Transaction is acquired |
| 07 | Transaction was surcharged |
| 08 | Transaction was not surcharged |

Header Template

| # | Internal data | Len | Comments |
|---|---|---|---|
| 1 | H0151 | - | Header section |
| 2 | dB | 02 | Destination is both printers (optional) |
| 3 | X00116L15%m/%d/%y %H: %M | 24 | Tran timestamp with mask |
| 4 | X01703R00 | 09 | Rightmost 3 of terminal id |
| 5 | z0100 | 05 | Next line |
| 6 | z0100 | 05 | Next line |
| 7 | X02620L00 | 09 | Terminal street address |
| 8 | z0100 | 05 | Next line |
| 9 | X02717L00 | 09 | Terminal City |
| 10 | X02802L00 | 09 | Terminal State |
| 11 | z0100 | 05 | Next line |
| 12 | z0100 | 05 | Next line |
| 13 | dC | 02 | Receipt printer only |
| 14 | X01520L00 | 09 | Suppressed PAN |
| 15 | dA | 02 | Aux printer only |
| 16 | X01320L00 | 09 | Full PAN |
| 17 | dB | 02 | Both printers |
| 18 | z0100 | 05 | Next line |
| 19 | X00208L08%m/%d/%y | 09 | Business date with mask |

Detail Template

| # | Internal data | Len | Comments |
|---|---|---|---|
| 1 | D0210 | - | Detail lines section |
| 2 | DB | 02 | Destination is both printers (optional) |
| 3 | z0100 | 05 | Next line |
| 4 | X01005L00 | 09 | Host trancode with 3 spaces |
| 5 | C040000004 | 10 | Condition defining offline |
| 6 | t01 | 04 | Offline indicator |
| 7 | C030000004 | 10 | Condition defining online |
| 8 | t01 | 04 | Online indicator |
| 9 | X01604R00 | 09 | Serial number |
| 10 | X0060BR02%C | 11 | Completed amount with symbols |
| 11 | z0100 | 05 | Next line |
| 12 | C010310028 | 10 | Condition based on avail balance field |
| 13 | t09Avail_Bal | 12 | Text for available balance |
| 14 | X03111R02%C | 11 | Available balance with symbols |
| 15 | z0100 | 05 | Next line |
| 16 | C010320027 | 10 | Condition based on ledger balance field |
| 17 | t08Curr_Bal | 11 | Text for ledger balance |
| 18 | X03212R02%C | 11 | Ledger balance with symbols |
| 19 | z0100 | 05 | Next line |
| 20 | C070000056 | 10 | Condition based on surcharged |
| 21 | t08Term_Fee | 11 | Text for Terminal fee |
| 22 | X00712R02%C | 11 | Completed terminal fee with symbols |
| 23 | z0100 | 05 | Next line |
| 24 | t10Tran_Total | 13 | Text for total amount |
| 25 | X00807R02%C | 11 | Completed total with symbols |
| 26 | z0100 | 05 | Next line |

Trailer Template

| # | Internal data | Len | Comments |
|---|---|---|---|
| 1 | T0034 | - | Trailer lines section |
| 2 | DC | 02 | Destination is Consumer Printer only |
| 3 | X01820L00 | 09 | Marketing Line 1 |
| 4 | X01920L00 | 09 | Marketing Line 2 |
| 5 | X02020L00 | 09 | Marketing Line 3 |
| 6 | z0200 | 05 | Form feed |

Fig. 12

AUTOMATED TELLER MACHINE PRINTER SYSTEM AND METHOD

CROSS REFERENCE TO RELATED APPLICATIONS

This application claims benefit of U.S. Provisional Application Serial No. 60/328,394 filed Oct. 9, 2001.

TECHNICAL FIELD

This invention relates to automated transaction machines. Specifically, this invention relates to an automated transaction machine system and method that is operative to print transaction documents such as transaction receipts responsive to user-defined document templates.

BACKGROUND ART

Automated transaction machines such as automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers checks. For purposes of this disclosure references to an ATM, an automated banking machine or automated transaction machine shall encompass any device which carries out transactions including transfers of value.

ATMs are generally equipped with one or more printers such as a receipt printer, journal printer, depositor printer, and statement printer. For receipts, software operating in the ATM is operative to cause a receipt printer to output a document that includes information about the transactions performed with the ATM. For example, after a withdrawal of cash many ATMs are operative to print a receipt that shows the amount of cash withdrawn from an account. Such a receipt may further include the date of the transaction, the account number associated with withdrawal of cash, the remaining balance in the account or any other information available to the ATM which may be useful to a consumer. Other types of printers in an ATM may print similar transaction information. For example, a depository printer may be operative to print an account number on a deposit envelope. Journal printers may be operative to print an ongoing log of transactions. Statement printers may be operative to print a listing of transactions conducted on one or more accounts of a user. In addition to printers, an ATM display screen may be operative to output details of the transactions.

Printer devices in ATMs and printer paper for the printer devices are also available in many different sizes and configurations. For example, some receipt printers may only print a maximum of 25 characters on each line while other receipt printers may print 40 characters on each line. Some types of receipt paper stock have pre-printed logos or other information, while other receipt paper stock is blank. Some types of receipt printers are designed to print on individual pre-cut sheets of paper, while other receipt printers are designed to print on a continuous roll of paper. Some printers are capable of printing multiple colors, while other printers are operative to print only in one color such as black. Further, some printers are operative to print image bitmaps, while other printers may only print characters from a fixed character set.

Because an ATM may be configured to use a plurality of different types, sizes and configurations of printers, it may be useful for ATM applications to be operative to print a plurality of differently formatted documents responsive to the type, size and configuration of the printer. For example, it may be useful for ATM applications to include specific software components for each different type of printer that may be installed in the ATM. Such components may be specifically "hard coded" to cause a printer to print a document which is compatible with the printer. However using such an approach, if it ever becomes desirable to change features that are printed on the document, the individual software components responsible for printing to each of the different printers must be rewritten. Writing new programs to print new versions of receipts or other documents is time consuming and often can only be done by a user who is both skilled in the art of programming and has a detailed knowledge of the targeted printers and the ATM application.

Consequently, there exists a need for an improved system for printing to different types, sizes and configurations of printer devices in an ATM which enables an operator to customize the formats of the documents more easily. There exists a need for a system of printing to different types, sizes and configurations of printer devices in an ATM which enables an operator to customize the formats of the documents without writing new software components for each different type of printer device. There further exists a need for a system for generating new types of ATM receipts which does not require procedural programming language skills and detailed knowledge of ATM software and hardware systems.

DISCLOSURE OF INVENTION

It is an object of an exemplary form of the present invention to provide an automated transaction machine at which a user may conduct transactions.

It is a further object of an exemplary form of the present invention to provide an automated transaction machine that enables customized control over the printing of documents.

It is a further object of an exemplary form of the present invention to provide an automated transaction machine that enables the customization of the formats of documents printed with the machine.

Further objects of exemplary forms of the present invention will be made apparent in the following Best Modes for Carrying Out Invention and the appended claims.

The foregoing objects are accomplished in an exemplary embodiment of the invention by an automated transaction machine that may include output devices such as a display screen, and input devices such as a touch screen and/or a keyboard. The transaction machine may further include devices such as a cash dispenser device, one or more printer devices, a card reader/writer device, a depository device and other transaction function devices that are used by the machine in carrying out transaction functions.

The automated transaction machine may be in operative connection with at least one computer. The computer is in operative connection with the output devices and the input devices, as well as with the cash dispenser device, printer device, card reader device, depository device and other physical transaction function devices in the transaction machine.

The automated transaction machine may be in operative connection with at least one data store. The data store includes data corresponding to a plurality of document templates which are stored therein. The document templates define a format for printing documents with one or more printer devices of the automated transaction machine. In an exemplary embodiment, the document templates include a plurality of tags. The tags may specify the information that is to be printed on the document. The tags may also specify the destination printer or screen device for outputting the document. The tags may further specify features of indicia included in the document such as the formatting of numbers and dates. In an exemplary embodiment of the document template, the tags may correspond to the eXtensible Markup Language (XML). However, in alternative exemplary embodiments the tags may correspond to any structure or syntax which is capable of being parsed by a computer to determine a format for printing or displaying a document.

Each of the document templates stored in the data store may be associated with a plurality of template attributes. The template attributes classify the document templates by their targeted use. For example, template attributes may specify the line width of the printer device which is compatible with the document template. Template attributes may further specify the types of transactions that correspond to the document template. For example, a document template may define the format for a withdrawal receipt. Corresponding template attributes for this described document template may indicate that the document template corresponds to a withdrawal transaction. Template attributes may further specify the types of transaction outcomes that correspond to the document template. For example, a document template may define the format for a receipt which indicates that a transaction is unsuccessful. Corresponding template attributes for this described template may indicate that the document template corresponds to an unsuccessful transaction.

Document templates may also specify the type of consumers that correspond to the document template. For example, a document template may define a marketing message targeted to consumers belonging to a particular financial institution. Corresponding template attributes for this described template may indicate that the document template corresponds to consumers of the financial institution.

In addition, document templates may further include template attributes that indicate an overall type of the document template. Document template types may correspond to which section or portion of a document that the document template pertains. For example, template attributes may indicate that the document template corresponds to a header, trailer, or detail section of a document. An exemplary automated transaction machine may be operative to produce a document responsive to multiple document templates, where each document template is directed to producing a different section of the document.

An exemplary embodiment includes one or more software applications operative in or connected to the computer of the automated transaction machine. The software applications are operative to cause the computer to perform a transaction function with the transaction function device responsive to at least one input received through at least one input device. Such a transaction function may include the printing of a document by more than one type of printer device. For example, at the conclusion of a cash withdrawal an automated transaction machine may print both a transaction receipt with a receipt printer and a journal entry of the transaction with an internal journal printer. In an exemplary embodiment, the document template is operative to specify one or more types of different printer devices and/or a screen device of the machine for outputting documents.

In an exemplary embodiment, the software application may further be operative to select a document template from the data store responsive to characteristics of the transaction function, characteristics of the printer device, and/or any other useful property that corresponds to the template attributes associated with the document templates. Exemplary embodiments of the software application may bee operative to select document templates based on one or more of the template attributes matching a desired set of characteristics or properties.

In an exemplary embodiment, the template attributes may include no attribute for one or more selectable characteristics. For example, a document template may have template attributes that correspond to a specific transaction type, however the document template may not have template attributes which indicate characteristics of printer hardware. In such cases, the software application of the automated transaction machine may be operative to select and use the document template to produce documents for the indicated transaction type by causing operation of any of the printer devices that may be installed in the automated transaction machine.

The software application may be operative to cause the computer to print a document using a printer device responsive to the retrieved document template and the transaction function. In general, the software application may cause a document to be printed that includes transaction indicia that is representative of information about the transaction function. For example, if a transaction receipt is required to be printed, the retrieved document template may specify that an amount of value and/or an account number associated with the transaction is to be printed on the document.

In an exemplary embodiment, the document templates are constructed with a template builder application. The template builder application enables a user to select specific types of information that are to be printed out responsive to the document template. The information is organized using XML tags. The tags may include static text such as labels. The tags may further include tokens which are filled-in through operation of the software application of the computer in or connected to the automated transaction machine when a document is constructed responsive to the document template. Such tokens may correspond to data elements associated with a transaction function, such as an account number or an amount of a balance. Tokens may also reference data elements indicative of internal configuration information associated with the automated transaction machine, such as an address of the building where the automated transaction machine is located.

Tags may also include conditional expressions. For example, when the automated transaction machine constructs a document responsive to a document template, static text and tokens associated with a conditional expression are only printed out when the conditional expression is true. For example, if the conditional expression corresponds to a surcharge being assessed to the transaction, then text associated with the conditional expression will only be printed for transactions that include a surcharge.

In an exemplary embodiment, the template builder is operative to produce a visual representation of a document responsive to the selected tags. The visual representation functions as a print preview and enables the machine operator to verify that the document template will produce the desired format for a document. The exemplary template builder is further operative to produce a list of all conditional tags that are part of the document template. The exemplary template builder is operative to enable the user to individually toggle each of the conditional tags between two states. Information associated with conditional tags toggled to a first state are displayed in the visual representation of the document. Those conditional tags toggled to a second state are not displayed in the visually representation of the document. The toggling of conditional tags between different states enables the operator to quickly show each of the different views of a document which may be produced responsive to the document template.

In an exemplary embodiment of the present invention, the tags based document template may be converted to a runtime format template that may be more efficiently used to generate a document by the automated transaction machine. For example, such a runtime format may correspond to a metasyntatic notation such as a Backus Naur Form (BNF) format. However, in alternative exemplary embodiments documents may be produced responsive directly to the tag based document template. In an exemplary embodiment, tag based document templates which correspond to different sections (header, trailer, detail) of a document may be combined together when forming the runtime format template.

BRIEF DESCRIPTION OF DRAWINGS

FIG. 3 is a schematic view of an exemplary embodiment of a document template.

FIG. 5 is a listing of tags for an exemplary embodiment of the document template.

FIG. 6 is a listing of token tag properties for an exemplary embodiment of the document template.

FIG. 7 is a listing of predefined data elements for the ID property of the exemplary embodiment of the token tag.

FIG. 8 is a listing of format mask codes for the exemplary embodiment of the token tag.

FIG. 9 is a further listing of format mask codes for the exemplary embodiment of the token tag.

FIG. 10 is a listing of control codes for the ID property of an exemplary embodiment of a control tag.

FIG. 11 is a listing of conditional expression codes for an exemplary embodiment of the conditional tag.

FIG. 12 is a schematic view of an exemplary embodiment of a runtime document template.

BEST MODES FOR CARRYING OUT INVENTION

Figure 1:
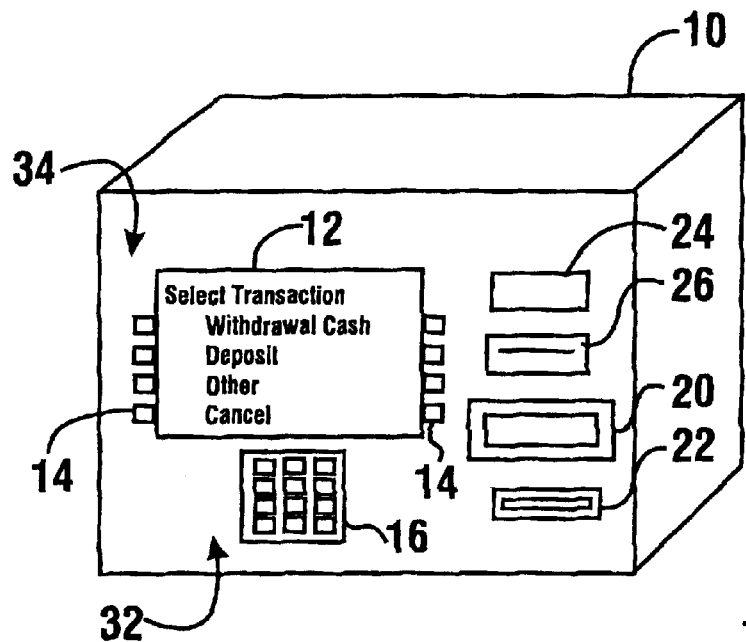
FIG. 1 is a perspective view of an exemplary embodiment of an ATM incorporating features of the present invention.

Referring now to the drawings and particularly to FIG. 1, there is shown therein a perspective view of an automated transaction machine or ATM 10 of one exemplary embodiment of the present invention. The exemplary automated transaction machine 10 may include output device 34 such as a display device 12. The display device 12 is operative to provide a consumer with a user interface 18 that includes a plurality of selectable options for operating the machine. The exemplary embodiment may further include other types of output devices, such as speakers or any other type of device that is capable of outputting visual, audible or other sensory perceptible information.

The exemplary automated transaction machine 10 may include a plurality of input devices 32, such as function keys 14 and a keypad 16. The exemplary embodiment may further include other types of input devices, such as a card reader 26, biometric reader, document reader, microphones or any other device that is operative to provide the machine with inputs representative of user instructions or information. The exemplary automated transaction machine 10 may further include a plurality of other transaction function devices 36, such as a sheet or cash dispenser 20, depositor 22 and receipt printer 24. Of course these devices are exemplary and in other embodiments other types of transaction devices may be used.

Figure 2:
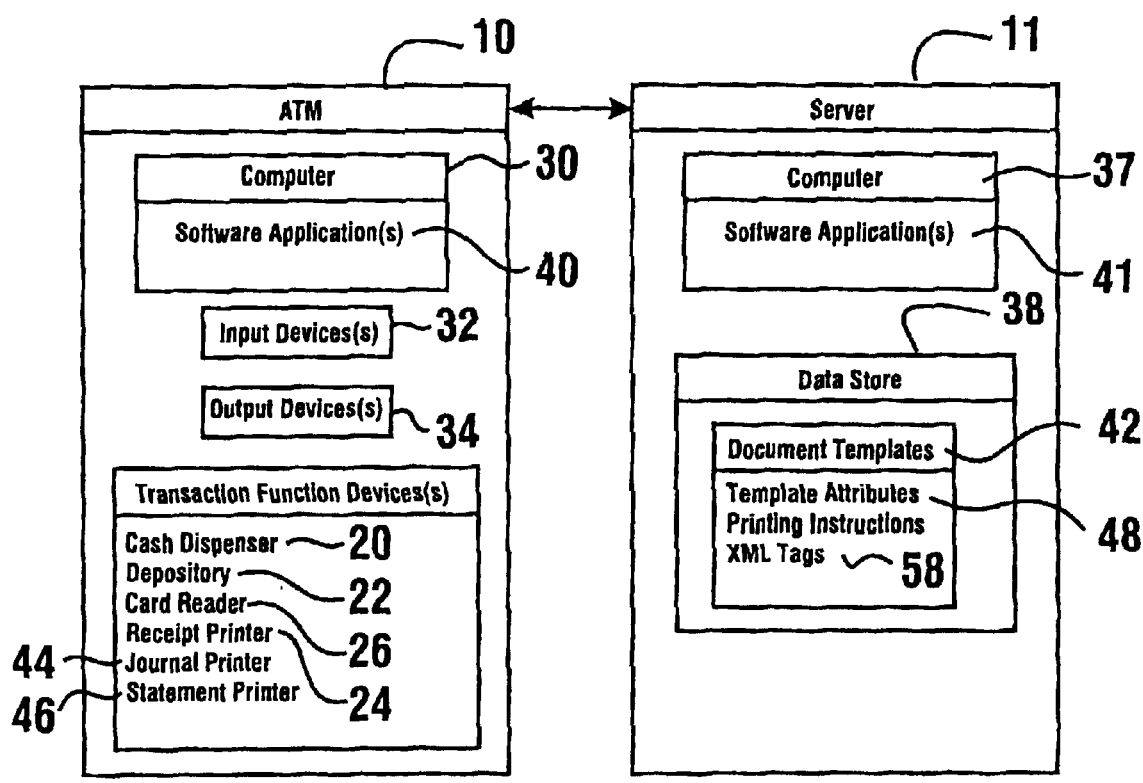
FIG. 2 is a schematic view of the exemplary embodiment of the ATM.

FIG. 2 shows a schematic view of components comprising an exemplary embodiment. The ATM 10 includes at least one computer 30. The computer 30 may be in operative connection with the input device(s) 32, the output device(s) 34, the transaction function device(s) 36, further computer(s) 37, and at least one data store 38. In the exemplary embodiment the computer 30 of the ATM may be operative to communicate with one or more servers 11 which may include the further computer(s) 37 associated with the ATM. The server 11 may also include the data store 38. However, in other alternative exemplary embodiments the data store 38 may be included in the ATM 10.

The exemplary embodiment may further include one or more software application(s) 40, 41 operative in the computer 30 of the ATM and/or further computers 37 associated with the ATM. The software applications may include for example, terminal control software, maintenance software, diagnostic software, host software, database software and any other software that enables the ATM to perform transaction functions for consumers or enables an operator to service, configure and maintain the ATM.

In the exemplary embodiment the server 11 with the further computer 37 may correspond to a host banking system 11 or other server which is operative to authorize a consumer to perform such transaction functions as withdrawing cash through operation of the cash dispenser device 20, depositing checks through operation of the depository device 22, performing a balance inquiry for a financial account and transferring value between accounts. In response to these transaction functions the exemplary embodiment of the ATM may be operative to use one or more printing devices to print information associated with the transaction functions in the form of transaction receipts, banking statements, journal entries and deposit envelopes.

The exemplary embodiment of the ATM may include printing devices such as a journal printer 44, a statement printer 46 and the previously described receipt printer 24. For many transaction function types, the exemplary embodiment of the ATM 10 is operative to cause the receipt printer 24 to print a receipt for the consumer and cause the journal printer 44 to print an entry of the transaction as part of an ongoing log of transactions. Such receipts may include transaction data such as the date of the transaction, the account number associated with the transaction, an amount of cash withdrawn or deposited, the balance in an account, the amount of value transferred between accounts, or any other information available to the ATM which may be useful to document for the operator of the ATM or a consumer who is a user of the ATM. For deposit transactions, the exemplary embodiment of the ATM 10 may be operative to cause a depository printer associated with the depository device to print an account number or other transaction information on a deposit envelope.

The exemplary ATM 10 may be operative to print receipts, journal entries and other documents responsive to documents generated responsive to one or more document templates. In the exemplary embodiment the data store 38 may include data corresponding to a plurality of document templates 42 stored therein. The exemplary document templates may include instructions which define the format of documents which may be printed by the ATM through operation of the printer devices 24, 44, 46 and which may be presented through an output device 34, such as a display screen 12. The document templates of the exemplary embodiment may also include instructions for formatting indicia printed on deposits made using the depository device 22.

Each of the document templates may be associated in the data store with template attributes 48. Template attributes classify the document template by the intended uses of the document template. An exemplary embodiment of a software application may be operative to cause the computer 37 to select the document templates 42 from the data store 38 responsive to the template attributes 48. Document templates which have template attributes which match an intended use of the document template may be selected by the software application. For example, template attributes may specify hardware characteristics such as printer width and/or may specify transaction type, such as a withdrawal of cash. When the ATM requires a transaction receipt for the withdrawal to be printed out to a receipt printer which utilizes paper of a certain paper size, the ATM may be operative to cause the data store to be queried to retrieve document templates with template attributes that match the paper size requirement of the receipt printer and are designed to be used for formatting transaction receipts for such a withdrawal transaction. Of course it should be understood that other templates may be used in conjunction with printing documents associated with other transaction types.

Figure 4:
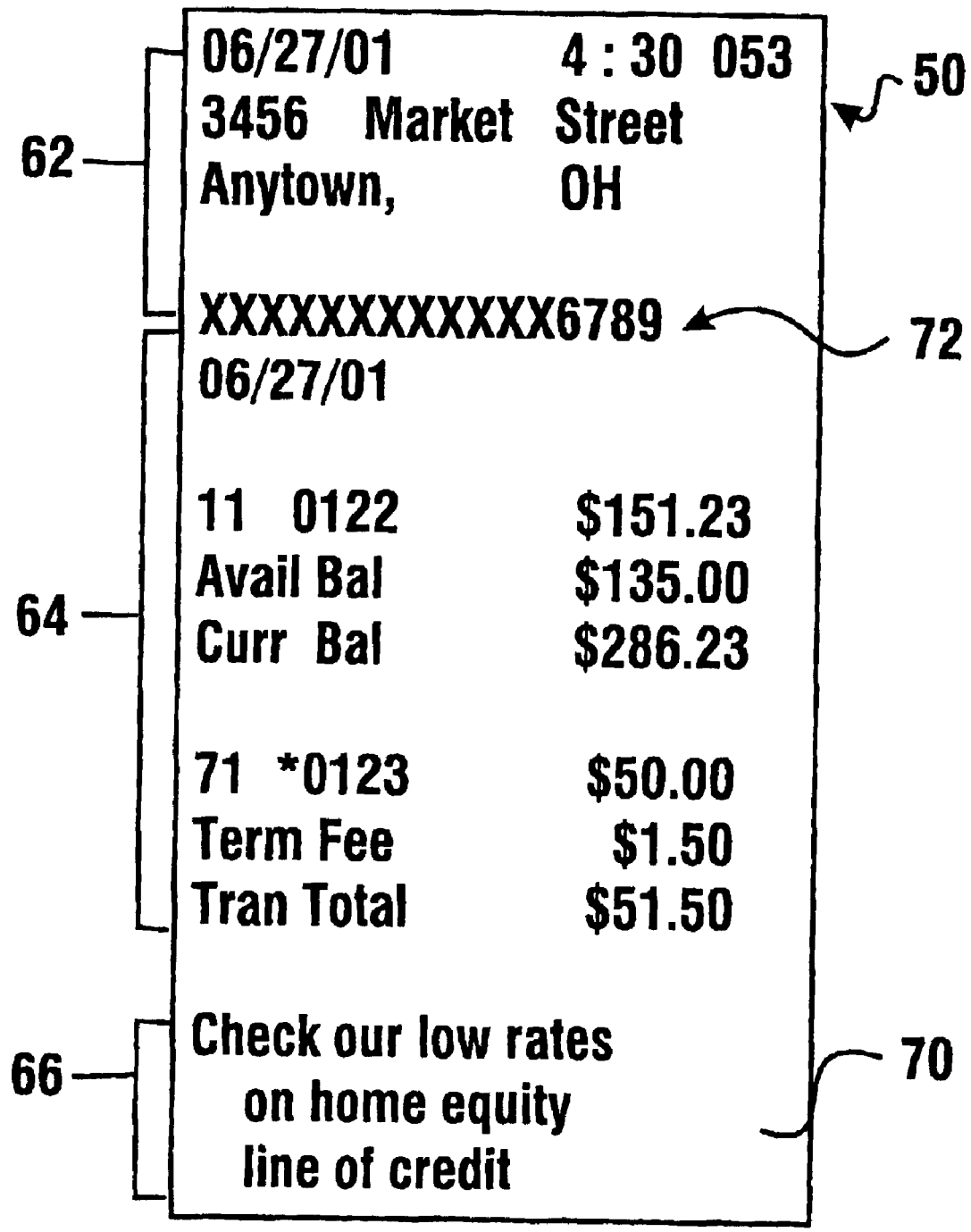
FIG. 4 is representative of an exemplary embodiment of a transaction receipt.

FIG. 3 shows an example of exemplary embodiments of three types of document templates 52, 54, and 56 which may be used to construct a document 50 printed by the ATM 10. Each of the document templates 52, 54, and 56 define the construction of a different section of a document, such as a header section 62, detail section 64 and trailer section 66 of the document 50. An example of the document 50 produced responsive to the document templates 52, 54, and 56 is shown in FIG. 4. Here the document 50 corresponds to a printed transaction receipt 70. The transaction receipt 70 includes transaction indicia 72 printed thereon, which is representative of information associated with transactions performed with the ATM.

As shown in FIG. 3, the exemplary embodiment of the document templates 52, 54, and 56 includes a plurality of printing instructions 58. These printing instructions correspond to tags which define the format of transaction data and other information that is used to produce the document 50. In this described exemplary embodiment, the tags conform to an eXtensible Markup Language (XML) syntax and have unique identifiers and delimiters such as "<" and ">" to separate them from the rest of the information in the template. Tags also have beginning and ending forms. For example, a hypothetical tag called "tag" has a beginning form of <tag> and an ending form of </tag>. Data related to the tags are placed between the beginning and ending forms of the tags, such as: <tag> data </tag>. If the tag does not have data, rather then using a beginning and ending form, an alternative format of the tag may have the form <tag/>.

Properties of the tags may be included within the tag delimiters "<"and ">". For example, a tag may include an identification property of "id". As a result, the beginning tag may further include the form <tag id='1'>. FIG. 5 shows a listing of tags 80 used in connection with one exemplary embodiment. The beginning form of these tags include <token>, <text>, <dest>, <cntl>, <cond>, <hdr>, <det>, <trlr>, <dep> and <scr>. Many of these tags may also have a corresponding ending tag. For example, the ending tag for the beginning tag <text> is </text>. Some of these tags may not have any associated data and therefore may be used with the alternative form such as <token/>.

In the exemplary embodiment, the token tag such as <token/> may be used to insert a defined data element into a document which is to be printed by the ATM. FIG. 6 shows an example of properties 82 for a token tag, such as <token>. The exemplary embodiment of the <token> tag includes an "id" property, which specifies an identifier of the defined data element. In addition, the <token> tag may include formatting properties such as "len", "align", "mask", "label" and "lpos" which define the format of the data element being inserted into the document. For example, the "len" property specifies a length to override the default length of the data element. The "align" property specifies the left-right-center alignment of the data element. The "mask" element specifies a formatting mask for customizing the display of a date, numeric or textual data element. The "label" property specifies a label to be associated with the data element in the document. The "lpos" property specifies the left, right position of the label in relation to the data element.

The following is an example of a token tag with these properties:

<token id='002'len='20'align='L'label='Date:'lpos=
      'L'mask='%B %d, %Y'/>

Here the value of 002 associated with the id property corresponds to the defined element of a business date. If the current business date associated with the ATM is 'Jun. 16, 2001', the exemplary software is operative to parse this token to produce a document with the printable indicia: "Date: Jun. 16, 2001". FIG. 7 shows an example listing of id property values 84 for the <token> tag and their associated defined data elements 86. In the exemplary embodiment, the computer 37 associated with the ATM 10 may be operative to determine the defined data elements 86 at runtime and insert them in the document responsive to the <token> tag.

FIGS. 8 and 9 show examples of formatting codes 88 which may be used in the mask property of tags to format data elements, text or other indicia specified by tags. For example, as used above in the sample tag, the codes "%B" 90, "%d" 92, and "%Y" 94 may be used to specify the insertion of a business date into a document with a date format that includes the full month name, the day of the month and the 4 digit year.

In the exemplary embodiment, static text tags such as <text> and </text> may be used to insert fixed text into a document. For example, a document template with: <text> Ask us about our Mutual Funds</text>, would produce a document that includes the phrase "Ask us about our Mutual Funds".

Destination tags such as <dest> and </dest> in the exemplary embodiment, may be operative to specify a code which corresponds to the intended destination for indicia produced responsive to tags which follow the <dest> and </dest> tags in the document template. Example codes for the <dest> and </dest> tags correspond to destination devices such as: a consumer (receipt) printer, an auxiliary (journal printer), both costumer and auxiliary printers, a depository printer, a statement printer or the ATM/terminal screen. The indicia defined by tags following the <dest> tag will continue to go to the specified printer until another <dest> tag is encountered in the document template. Multiple <dest> tags can be used in a document template to cause formatted information to be output to a plurality of different printers in the ATM and/or a screen display of the ATM.

The sample document templates 52, 54, and 56, of FIG. 3 show an example of a use of the destinations tag. Here the header document template 52 and the detail document template 54 include the destination tags <dest>B</dest> which specifies that the header and detail sections of the document are to be printed by both the receipt printer and the journal printer. The trailer document template 56, however, includes the destination tags <dest>C</dest> which specifies that the trailer section is only to be printed to the receipt printer (consumer printer). Thus, when a document is printed to the receipt printer, it will include the header, detail and trailer sections 62, 64, and 66 as shown in FIG. 4. However, when the document is printed to the journal printer, it will only include the header and detail sections 62 and 64. In this manner, the marketing information in the trailer section 66 can be omitted from the journal printouts to reduce the amount of paper that is consumed for each transaction.

A control tag such as <cntl> in the exemplary embodiment is used to pass pre-defined control sequences to the destination of the document such as a printer or a screen. Such control sequences, for example, may cause a form feed, change fonts and character sets or reposition a cursor on a screen. The <cntl> tag includes an "id" property which specifies what type of printer or display code is to be inserted into the document. The <cntl> tag also includes a "cnt" property for specifying the number of occurrences of the control code data to insert. The <cntl> tag also includes a "data" property which defines a value or other data that may be required by the control sequence. FIG. 10 shows an example listing of control codes 96 which may be specified using the <cntl> tag.

A conditional tag such as <cond> in the exemplary embodiment, includes an "id" property which specifies pre-defined conditional expressions which may be either true or false. The <cond> tag further includes a <data> property which specifies an identifier of a pre-defined data element. In the exemplary embodiment, the identifier used in the data property for the <cond> tag corresponds to the id properties values 84 shown in FIG. 7 for the <token> tag. As discussed previously, the id properties 84 corresponds to defined data elements 86 of the ATM.

At runtime, the conditional expression is evaluated based on the value of the data element. The true/false result of the evaluation of expressions dynamically determines whether to include or not to include indicia defined by tags nested within the beginning <cond> and ending </cntl> conditional tags. For example, a document template may include the following tags:

<cond id='01'data='002'>
    <token id='002'align='L'label='Date:'lpos='L'mask='%B %d, %Y'/>
    </cond>

The "id" property value of '01'corresponds to an expression which determines if the element defined by the 'data' property is present. As discussed previously, (FIG. 7) the '002' value corresponds to the data element of a business date. Thus, if the business date is present the conditional expression will be true and the <token> tag will be used to insert the business date in the document. If the business date is not present, the conditional expression will be false and the <token> tag or any other nested tags will be ignored.

FIG. 11 shows an example listing of conditional "id" property codes 98 which correspond to condition expressions used in <cond> tags. Examples of condition expressions include whether: data elements are or are not present, whether a transaction was authorized online or offline, whether a transaction is proprietary, whether the transaction is acquired and whether a transaction was or was not surcharged.

Header tags such as <hdr> and </hdr> in the exemplary embodiment may be used in document templates to define a header section for a document. Tags nested between the <hdr> and </hdr> tags typically insert information into the top of a document such as a consumer's Primary Account Number (PAN), transaction business date and terminal location. Detail tags such as <det> and </det> in the exemplary embodiment, may be used in document templates to define a detail section for a document. Tags nested between the <det> and </det> tags typically insert information about specific transactions such as the transaction type, transaction amount and referenced account number. Trailer tags such as <trlr> and </trlr> in the exemplary embodiment, may be used in document templates to define a trailer or footer section for a document. Tags nested between the <trlr> and </trlr> tags may be used in exemplary embodiments to insert marketing information or institution information.

Although the header, detail and trailer sections of a document may be specified by individual header, detail and trailer document templates, in alternative exemplary embodiments a document may be produced responsive to a single document template which includes tags segregated into groups by the <hdr>, <det> and <trlr> tags.

Deposit tags such as <dep> and </dep> in the exemplary embodiment, may be used in document templates to define a deposit section for a document. Tags nested between the <dep> and </dep> tags are typically used to define the output of transaction information, such as account numbers and deposit amounts or any other information which is to be printed on deposit envelopes. Generally, no destination tags are allowed to be nested between the <dep> and </des> tags.

Screen tags such as <scr> and </scr> in the exemplary embodiment, may be used in document templates to define a screen section for a document. Tags nested between the <scr> and </scr> tags arc typically used to send a screen update in the terminal's function command. Generally, no destination tags are allowed to be nested between the <src> and </src> tags.

In an exemplary embodiment, one or more document templates may be converted to a runtime format with a more compact size than the described tag based document template. An example of such a runtime document template format is shown in FIG. 12. Here the runtime form 100 of the document template includes only the data listed under the internal data column 102. The Line number (#), Len and Comments columns are shown for descriptive purposes only. This exemplary runtime form 100 of the document template corresponds to the tagged based forms 52, 54 and 56 of the document templates shown in FIG. 3. An exemplary embodiment of the ATM, may be operative to produce the transaction receipt 70 shown in FIG. 4, responsive to the run-time form 100 of the document template.

In one exemplary embodiment, the runtime form of the document template corresponds to a Backus Naur Form (BNF). However, alternative exemplary embodiments of the runtime form may use any syntax which can be parsed and interpreted by one or more computers associated with an ATM to produce one or more documents. In the exemplary embodiment, the runtime form may include individual files for each of the previously described header, detail and trailer sections. In addition, exemplary embodiments of the runtime form may correspond to a single file that represents a combination of the information shown in the header, detail and trailer sections of the tagged form of the document templates.

Figure 13:
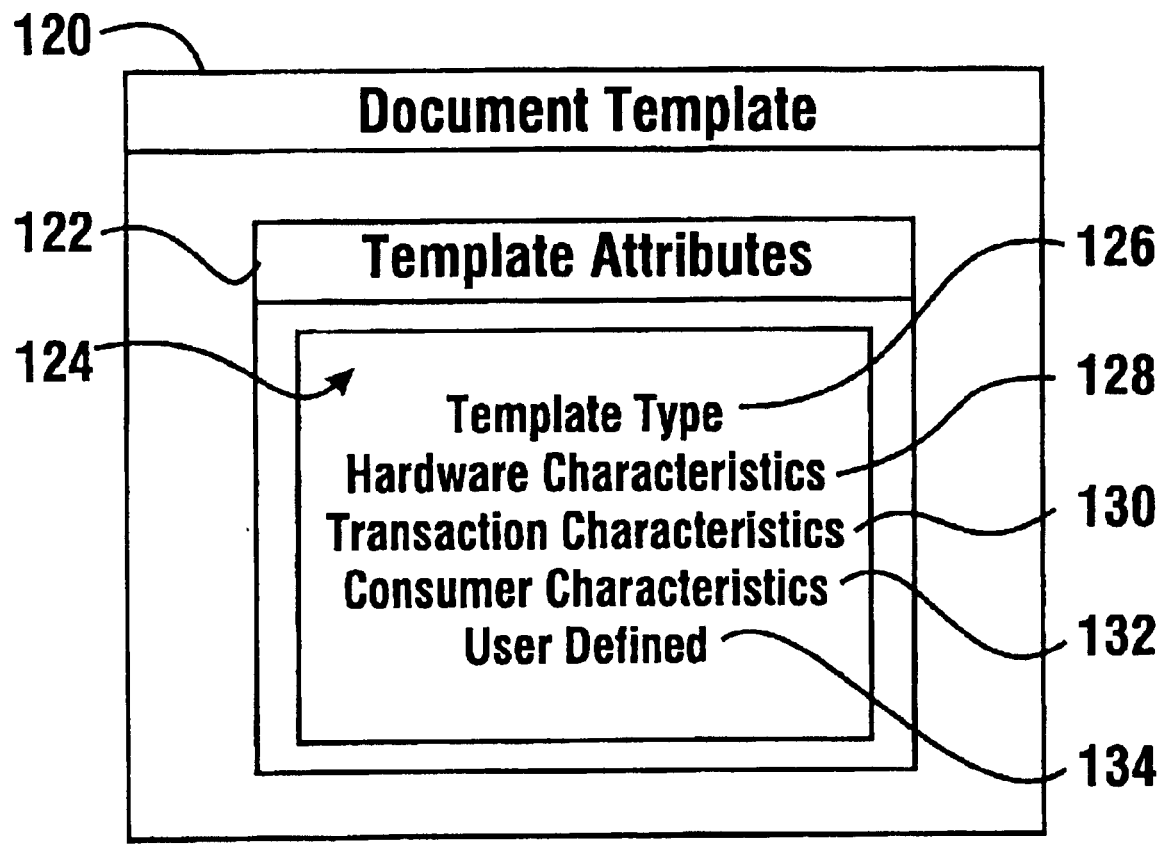
FIG. 13 is a schematic view of template attributes of an exemplary embodiment.

As discussed previously, each document template 120 may be associated with a plurality of template attributes 122. Template attributes 122 classify the document template by the intended use for the document template. FIG. 13 shows examples of the various categories 124 of template attributes which may be associated with a document template 120. These categories of attributes include template type 126, hardware characteristics 128, transaction characteristics 130, consumer or customer characteristics 132 and user defined characteristics 134.

Template type attributes 126 may classify the document template by whether the formatting instructions include tags for formatting header sections, detail sections and trailer sections of documents. The template type attributes may further indicate if the formatting instructions include tags for printing information on deposit envelopes with the depository device. In addition, the template type attributes may also indicate if the formatting instructions include tags for producing messages displayed with a display screen of the ATM.

Template attributes which represent hardware characteristics 128 may correspond to one or more specific properties of ATM hardware that are required to print documents formatted according to the associated document template. For example, template attributes corresponding to hardware characteristics 128 may indicate the minimum printing width or height of a printer device that is capable of printing a document formatted according to the document template. In an exemplary embodiment, the minimum width may be expressed in characters/line while a minimum height may be expressed in terms of the number of printable lines/document. Template attributes corresponding to hardware characteristics 128 may also indicate if the document template is intended to be used with pre-printed forms or with blank forms. In addition, template attributes corresponding to hardware characteristics 128 may further indicate if the document template is intended for terminals that support multiple print destinations within a single print stream.

Template attributes corresponding to transaction characteristics 130 may indicate the type of transactions that the document template is intended to be used in conjunction with and also the types of outcomes of transactions with which the document template is intended to be used. For example, a document template may be designed for formatting a withdrawal transaction receipt. Consequently, the associated template attributes may correspond to a withdrawal transaction. A further document template may be designed for indicating that a transaction has been denied. Consequently, the associated template attributes may correspond to a denied transaction.

In the exemplary embodiment, the template attributes may include a processing code which corresponds to one of a plurality of types or categories of transaction functions that can be performed by the ATM. The transaction function types may include for example, withdrawal of an amount of cash from a cash dispenser device, deposit of a check with a depository device, balance inquiries for financial accounts, transfers of value between accounts or any other transaction function which the ATM is operative to perform. By classifying document templates by transaction type, a computer associated with an exemplary ATM can retrieve document templates which are appropriate for the specific type of transaction. For example, if a transaction is for the deposit of a check, the computer associated with the ATM can retrieve document templates with attributes specifically targeted for deposits. Such document templates with attributes corresponding to a deposit type transaction may format a deposit receipt printed by a receipt printer. Such document templates with attributes corresponding to a deposit type transaction may also format indicia printed on the deposit envelope by the depository printer.

In the exemplary embodiment, the template attributes related to characteristics of transactions 130 may correspond to one of a plurality of types or categories of transaction outcomes that can occur at the ATM. Examples of transaction outcomes may include: whether a transaction was denied by an authorizer; whether a transaction was authorized and completed successfully; whether a transaction was authorized but was incomplete; or whether the transaction was authorized but completed for an amount different than what was authorized. By classifying document templates by outcome, the exemplary embodiment of the computer associated with the ATM may retrieve document templates which are appropriate for the specific outcome of a transaction. Document templates with attributes corresponding to incomplete transactions may include additional lines which explain the reason for the incomplete transaction, whereas document templates with attributes corresponding to successfully completed transactions may use the additional space on the document for a marketing message.

In the exemplary embodiment, the template attributes corresponding to characteristics of transactions may further indicate if the document template is compatible with a transaction that causes a programmed automatic presentation of a document, such as a transaction receipt. Other types of template attributes may correspond to other types of characteristics of transactions, such as whether a transaction fee is to be charged.

In the exemplary embodiment, template attributes which represent consumer characteristics 132 may correspond to one or more properties of a consumer that is operating the ATM to perform transaction functions. For example, template attributes representative of consumer characteristics 132 may correspond to the particular financial institution or other entity with which the consumer has an account relationship. Consumer type information for example may be retrieved from a consumer's ATM card, smart card or any other device that the consumer uses to gain access to the ATM. In addition, template attributes corresponding to customer characteristics 132 may indicate whether the consumer is or is not a customer of the financial institution which owns or operates the ATM being used by the consumer. For example, if the consumer performing a transaction with the ATM is not a customer of the financial institution operating the ATM, document templates can he retrieved which correspond to consumers who are not customers of the operator of the machine. Such templates may include marketing information targeted to such consumers which is designed to encourage the consumer to become a customer of the financial institution.

Further exemplary embodiments of the template attributes may include user defined template attributes 134. Such user defined attributes may correspond to information that is specific to the configuration of the ATM. In addition, user defined template attributes may further be based on other types of characteristics of the consumers, the transactions and the hardware devices associated with the ATM. Other types of user defined template attributes may correspond to any variable or data element available to the ATM that can be used by the ATM to select document templates. This may include consumer provided inputs as well as operator configured parameters.

In an exemplary embodiment, the software application operative in the computer(s) associated with the ATM is operative to select document templates which have template attributes which match a specific set of characteristics of hardware, transactions and/or consumers. If no documents have template attributes which exactly match the characteristics being searched, the exemplary software application is operative to select document templates which are neutral in one or more of the categories being searched.

For example, if the consumer withdrawing cash from the ATM is associated with a particular financial institution, the software application will first attempt to retrieve a document template with template attributes that correspond to the financial institution. However, if no document templates correspond to the financial institution, the exemplary embodiment of the software application will retrieve document templates with attributes that are neutral toward the type of financial institution. In the exemplary embodiment, template attributes which are associated with one or more wildcard "*" symbols, indicate that the attribute is wholly or partially neutral and may be used for any condition for the particular category of the attribute that includes the wildcard symbol. If the attribute is comprised solely of asterisks, the attribute may be wholly neutral and can be used to match any attribute. If an attribute has asterisks and characters other than asterisks present, then it is partially neutral and matches on characters other than an asterisk may be exact matches.

In an exemplary embodiment, a search for matching document templates may result in multiple document templates with template attributes that match the search criteria. As a result in an exemplary embodiment, the software application is operative to use a programmed order of precedence rules to establish the relative importance or weight of each template attribute in relation to other template attributes. For example, a priority number may be associated with each type of template attribute. The individual document template with the highest total of priority numbers is operative to be selected by the application software. In other exemplary embodiments, other rules and methods may be used to prioritize a plurality of matching document templates.

In an exemplary embodiment, the template attributes are stored as a string of characters. Groupings of the string of characters are associated with various categories of attributes. For example, a document template may be associated with the following template attribute string: Y025Y01NA*YCMPLT***H**.

Here the first five characters (Y025Y) represent hardware characteristics. The first character indicates if pre-printed forms are to be used. The next three characters (025) indicate the minimum line width in characters/line for a printer device capable of printing the form. The fifth character (Y) indicates whether the ATM supports multiple print destinations within a single print stream.

Characters 6–10 (01N) correspond to transaction characteristics. Characters six and seven (01) correspond to the process code for the transaction. The eighth character (N) corresponds to whether the transaction causes an automatic eject of a receipt. Characters nine and ten are not used and include the wild card characters ().

Template attributes corresponding to customer characteristics are represented by characters 11–15 (A*Y). Here the eleventh through fourteenth characters (A*) correspond to the four digit consumer card group (BIN) or ICT code associated with a consumer's card. For example if the consumer's ICT code corresponds to 'A000', the exemplary template attributes of A* would correspond to a match. This is because the first character of the ICT code 'A' equals the 'A' in the template attributes and the next three characters of the ICT code '000' are satisfied by the three wildcards '*' in the template attributes. The fifteenth character (Y) corresponds to whether the consumer is a customer of the institution that owns the ATM being used by the consumer.

Template attributes corresponding to transaction characteristics related to the outcome of transactions are represented by characters 16–20 (CMPLT). Here the five letter code 'CMPLT' corresponds to the transaction being completed successfully. Characters 21–25 of the template attributes (***) correspond to user defined attributes. Here wildcard symbols are present which indicates that the template attributes are neutral with regard to user defined attributes. The last five attributes (H) correspond to document template type. Here the 'H' character indicates that the document template includes instructions which define the header section of a document. The remaining four wild cards (**) are neutral with regard to other potential types of document templates. Of course this approach is exemplary and in other embodiments other approaches may be used.

In the exemplary embodiment, shown in FIG. 2, the further computer 37 associated with the ATM 10 may be operative to retrieve the document templates 42 from the data store 38 and generate print instructions representative of a receipt or other printed information, responsive to the retrieved document templates and data associated with the transaction being performed by the ATM. The print instructions may then be transferred to the ATM and printed out by a printer associated with the ATM as part of the transaction performed by the ATM. In alternative exemplary embodiments the computer 30 in the ATM may generate the print instructions locally responsive to document templates retrieved from the further computer 37. In further exemplary embodiments, the data store 38 may be located in the ATM 10, and the computer 30 may be operative to retrieve the document templates from the data store 38 responsive to the previously discussed template attributes of the document templates. The ATM 10 may then generate the print instructions locally responsive to the document templates and print to one or more printer devices responsive to the generated print instructions.

Figure 14:
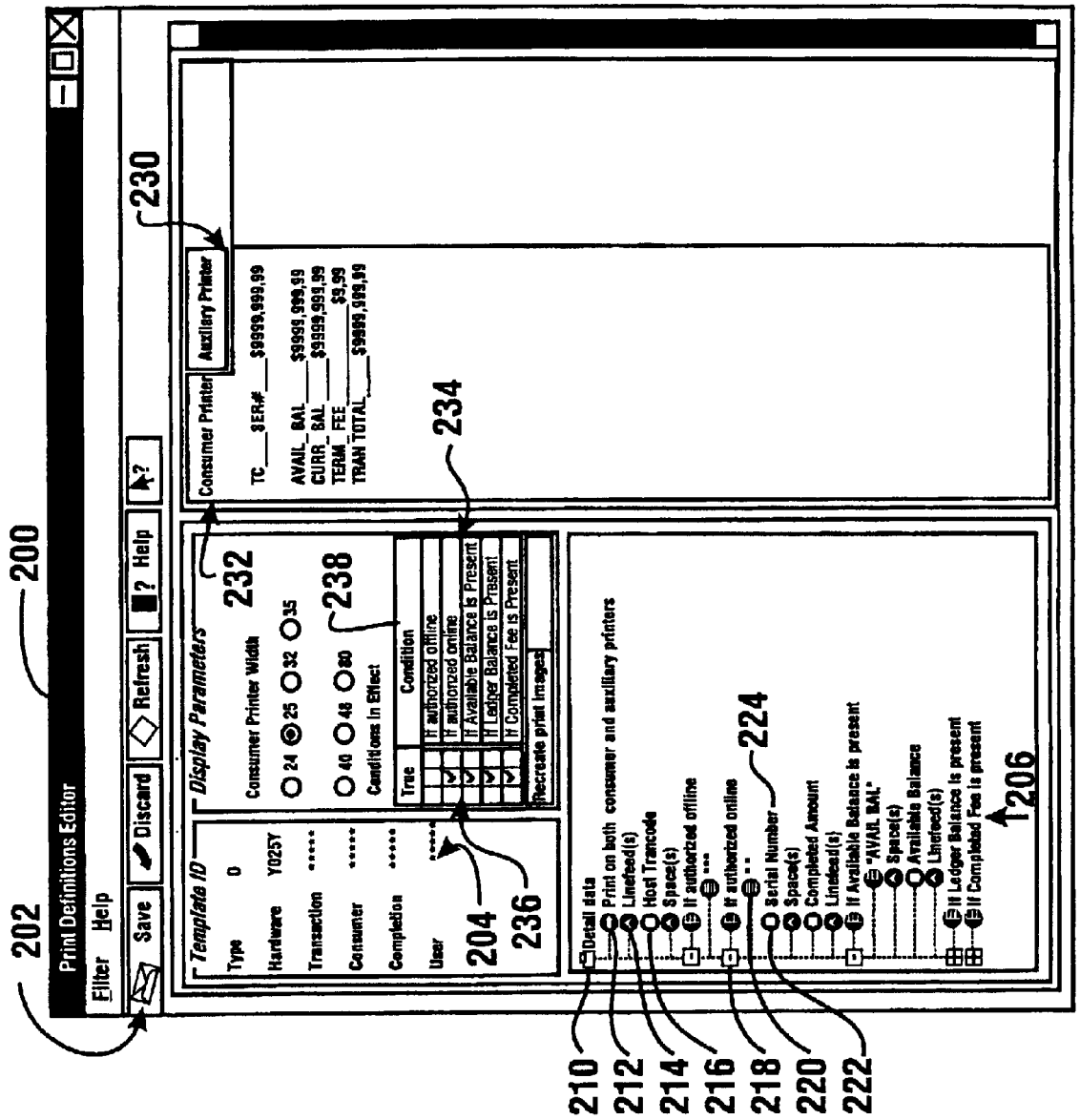
FIG. 14 is representative of a user interface screen which enables an operator to build document templates.

FIG. 14 shows an example of an output of a template builder software application 200 which enables an operator to build and modify the previously described document templates.

The exemplary embodiment of the template builder software 200 includes a user interface screen 202. The user interface screen 202 enables an operator to specify one or more template attributes to be associated with a document template being created or modified with the software 200. The template attributes are used to categorize the circumstances under which the document template may be used. As discussed previously, the template attributes may define the type of the template, hardware characteristics, transaction characteristics, consumer characteristics and user defined characteristics of the document template. The hardware characteristics may specify printer hardware requirements such as printer width, for which the document template is intended to be used. The transaction characteristics may specify the type of transaction function and the completion statuses of the transaction function for which the document template is intended to be used. The consumer characteristics may specify the types of consumers for which the document template is intended to be used.

In addition, the exemplary embodiment of the user interface screen 202 is operative to enable an operator to construct a listing of printing instructions 206 which define the format of a document generated responsive to the document template. When the document template is processed by a computer associated with an ATM to generate one or more corresponding documents, the order of processing of the printing instructions 206 is from top to bottom. Each line of the listing may correspond to one or more of the previously described tags 80 shown in FIG. 5. When the document template is saved, a corresponding XML document template may be generated such as the header, detail and trailer document templates 52, 54 and 56 shown in FIG. 3.

For example, the first line 210 includes detail section instructions which correspond to the previously described tags <det> and </det>. The detail section instructions specify that the following nested instructions are to be used to format a detail section of a document. The second line 212 includes a destination instruction which corresponds to the tags <dest> and </dest> and is used to specify one or more printer destinations such as a receipt printer and journal printer for printing the instructions that follow. In this exemplary document template, the third line 214 includes a control instruction which corresponds to the tag <cntl> and is used to pass pre-defined control sequences, such as a line feed to the destination printers. The fourth line 216 includes a token instruction which corresponds to the tag <token/> and is used to insert a predefined data element into a document, such as a host transaction code.

The sixth line 218 includes a conditional instruction which corresponds to the tags <cond> and is used to define a conditional expression, such as for example whether the transaction is authorized offline. If the conditional expression is true, the lines indented and nested below the conditional expression are processed. If the conditional expression is false, the lines nested below the conditional expression are ignored. In the example instruction listing 206, the seventh line 220 which is nested below the condition instruction corresponds to a static text instruction such as the tags <text> and </text> and is used to insert fixed text into the document, such as the asterisk "*" symbol. In the exemplary embodiment, the listing 206 is organized as a tree view. Instructions such as the sixth line 220 which are nested within a preceding instruction 218 are indented so that an operator can readily determine which instructions are nested. In addition, each line includes a graphical symbol 222 and descriptive text 224 which visually indicate the type and function of the printing instruction.

Figure 15:
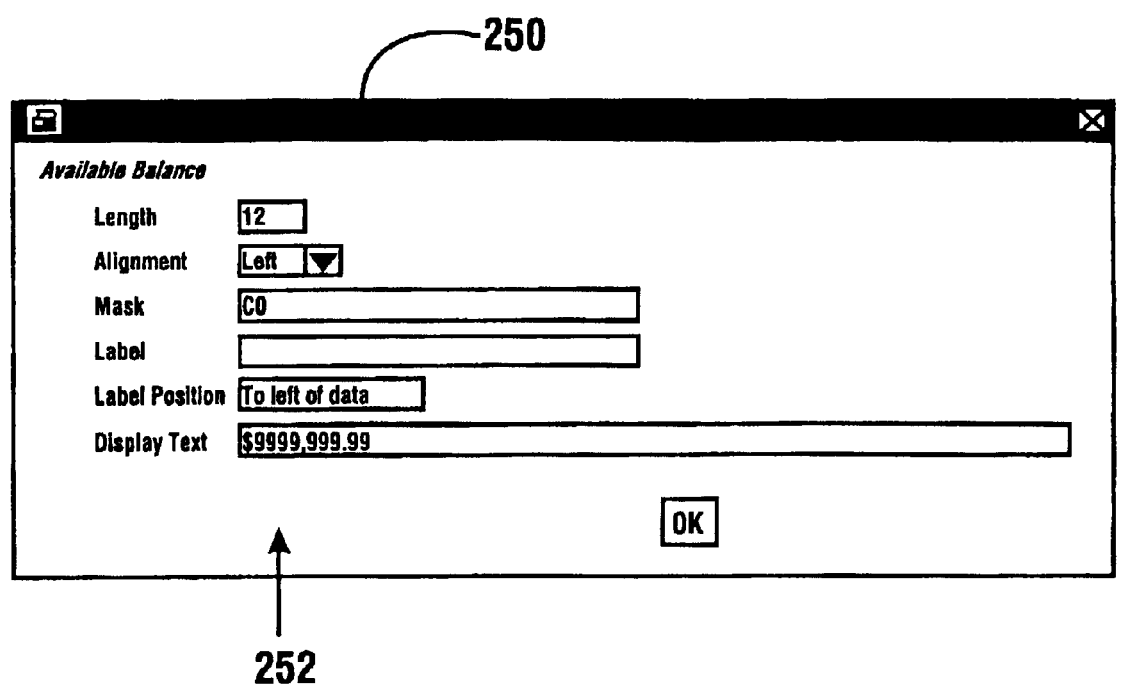
FIG. 15 is representative of an input screen which is operative to prompt an operator to input properties for construction printing instructions of a document template.

The exemplary embodiment of the user interface screen 202 enables a user to add, insert and delete printing instructions in the instruction listing 206 to construct a document template. When a new printing instruction is added to the listing 206, the exemplary embodiment of the user interface 202 may be operative to prompt the operator to enter or select values for each of the properties that are used to construct the corresponding XML tag. For example, when a token instruction corresponding to the data element of an Available Balance is inserted into the listing 206, a screen 250 as shown in FIG. 15 may be displayed. Screen 250 includes entry fields and drop-down-list-boxes 252 for inputting token properties which specify the display format for the data element.

Referring back to FIG. 14, the exemplary user interface screen 202 may also include a preview portion 230 which includes one or more visual representations of a document generated from the instructions added to listing 206. If the listing includes one or more destination instructions, such as the second line 212 which specifies more than one printer device or a screen device, the exemplary preview portion 230 of the present invention is operative to display different views such as selectable tabs 232 for each of the types of printer devices or screens specified. Each tab is operative to display a visual representation of a document that will be generated by the corresponding printer device or output through the screen responsive to the instruction in listing 206.

The exemplary embodiment of the user interface screen 202 may further include a selection portion 238. For each conditional instruction present in listing 206, the user interface screen 202 may be operative to display a corresponding entry 234 in the selection portion 238. Each entry 234 can be toggled between at least two states, such as between the states of true and false. The preview portion 230 displays a preview of a document responsive to the toggled state of each entry 234 in the selection portion 238. When the state is toggled to true for an entry 234 by proving an input that is operative to result in placing a checkmark 236 adjacent the entry, the document in the preview portion 230 is generated as if the corresponding conditional expression has evaluated to true. When the state is toggled to false for an entry 234 by removing a checkmark adjacent the entry, the document in the preview portion 230 is generated as if the corresponding conditional expression has evaluated to false. The exemplary embodiment of the condition selection portion 234 enables an operator to quickly select a plurality of different combinations of states for conditional expressions and immediately preview corresponding documents that are generated as a result of the selected states.

Figure 16:
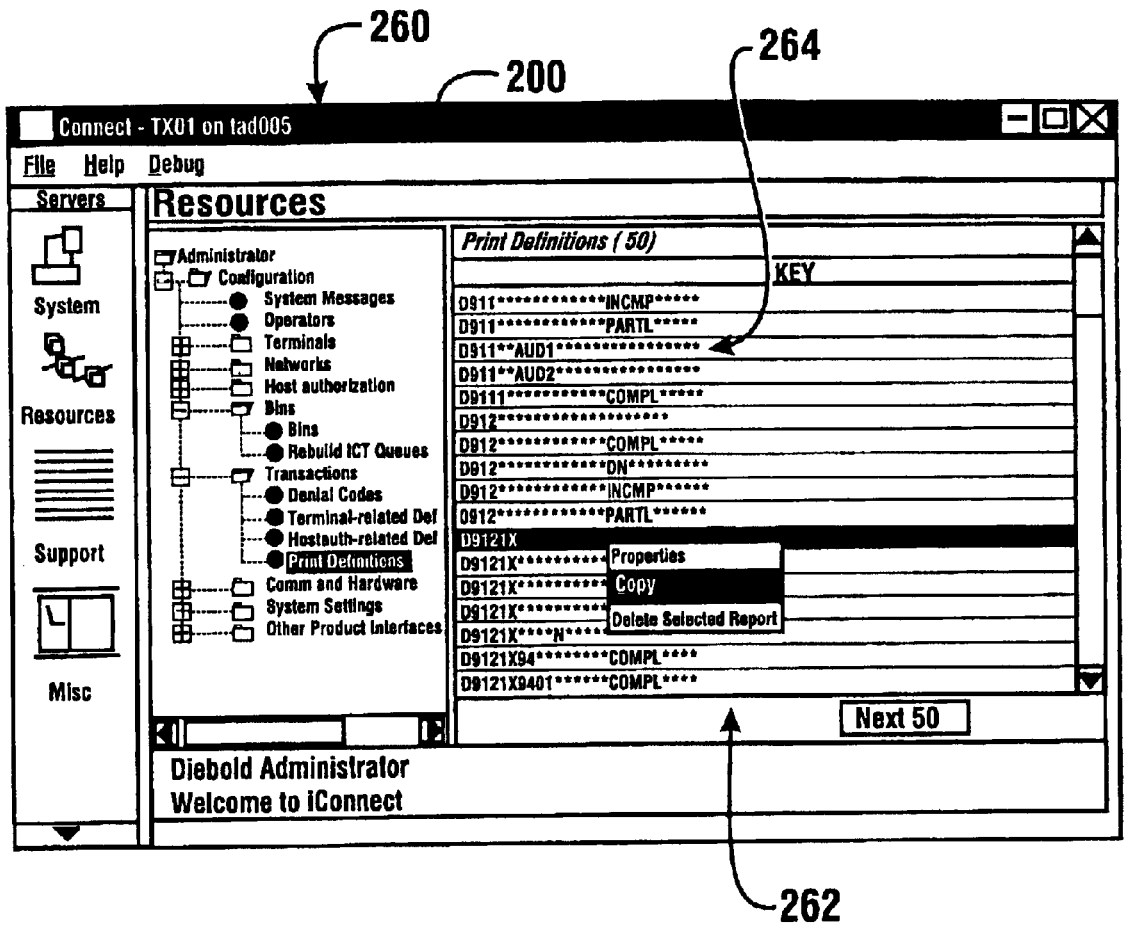
FIG. 16 is representative of a user interface screen which is operative to display and manage a plurality document templates.

As shown in FIG. 16, the exemplary embodiment of the template builder software 200 may further include a user interface screen 260 which is operative to display and manage a plurality of document templates generated with the software. The user interface screen 260 may include a listing of document templates 262 which includes the template attributes 264 for each document template. The user interface screen 260 enables an operator to select one or more document templates from the listing 260 to delete, copy and modify.

Document templates created with the template builder software 200 may be saved in one or more data stores in the previously described XML syntax, a Backus Naur Format or another parsable format and placed in operative connection with one or more ATMs. When an ATM performs a transaction function in response to an input from a consumer, software in the computer associated with the ATM may be operative to select one or more of the document templates responsive to the template attributes associated with the document templates. As discussed previously, document templates may be selected responsive to the type and/or completion statuses of the transaction functions being performed. Document templates may further be selected responsive to the features of printer or screen hardware devices available in the ATM. Document templates may also be selected responsive to the consumer or the financial institution of which the consumer is a customer. After selecting the document templates, the software of the ATM is operative responsive to the document templates to print or display information through one or more printers or the screen of the ATM.

In further exemplary embodiments, the ATM may be operative to generate messages or other streams of data responsive to the document templates. Such messages may be sent to a host banking system, log/report data store, or any other system or device that requires messages in particular formats. In addition to the template attributes discussed previously, in further exemplary embodiments, the template attributes of the document templates may further categorize the document templates in terms of their use in formatting messages being sent to other destinations by the ATM such as a host banking system or a data store connected to the ATM.

Thus, the exemplary form of the new automated transaction machine document template system and method of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the features and structures shown herein or mere equivalents thereof. The description of an exemplary embodiment in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method comprising:
   a) providing a plurality of document templates in operative connection with at least one computer associated with an automated banking machine, wherein each of the document templates is associated with a different set of template attributes, wherein the template attributes of the plurality of document templates correspond to characteristics of a plurality of printer devices, at least one of the printer devices being installed in operative connection with the automated banking machine;
   b) performing a first transaction function with the automated banking machine responsive to at least one input to the machine from a user;
   c) selecting at least one first document template from the plurality of document templates through operation of the at least one computer responsive to at least one first characteristic of a first printer device installed in operative connection with the automated banking machine; and
   d) printing a first document with the first printer device responsive to performing the first transaction function and the selected at least one first document template, wherein the first document includes indicia that is representative of information associated with the first transaction function.

2. The method according to claim 1, wherein in step (c) the template attributes associated with the at least one first document template correspond to the at least one first characteristic of the first printer device.

3. The method according to claim 2, wherein in step (c) the at least one first document template is associated with a plurality of tags, wherein in step (d) the tags are operative to specify a format for the indicia printed on the first document by the first printer device.

4. The method according to claim 2, wherein in step (a) the template attributes of the plurality of document templates further correspond to characteristics of transaction functions, wherein in step (c) the at least one first document template is further selected responsive to at least one first characteristic of the first transaction function.

5. The method according to claim 4, wherein the first transaction function corresponds to a first transaction function type, and wherein the template attributes associated with the at least one first document template further correspond to the first transaction function type.

6. The method according to claim 5, wherein each of the plurality of document templates includes at least one destination instruction which specifies at least one type of printer device, wherein the at least one first document template includes a destination instruction that corresponds to a receipt printer, wherein in step (d) the first printer device corresponds to a receipt printer type printer device.

7. The method according to claim 6, wherein step (b) includes dispensing cash from a cash dispenser of the machine, wherein the at least one first characteristic of the transaction function corresponds to a cash dispense transaction function type, wherein in step (c) the template attributes associated with the at least one first document template further correspond to the cash dispense transaction function type, wherein in step (d) the indicia printed on the first document includes transaction indicia representative of an amount of cash dispensed by the machine.

8. The method according to claim 7, wherein in step (c) the at least one first document template is associated with a plurality of tags, wherein the plurality of tags of the at least one first document template specify a format mask for the transaction indicia.

9. The method according to claim 6, wherein step (b) includes performing a balance inquiry for an account through communication with a host banking system, wherein the at least one first characteristic of the transaction function corresponds to a balance inquiry transaction function type, wherein in step (c) the template attributes associated with the at least one first document template further correspond to the balance inquiry transaction function type, wherein in step (d) the indicia printed on the first document includes transaction indicia representative of an account balance.

10. The method according to claim 6, wherein step (b) includes performing a transfer of value between at least two accounts through communication with a host banking system, wherein the at least one first characteristic of the transaction function corresponds to a transfer transaction function type, wherein in step (c) the template attributes associated with the at least one first document template further correspond to the transfer transaction function type, wherein in step (d) the indicia printed on the first document includes transaction indicia representative of an amount of value transferred between the at least two accounts.

11. The method according to claim 4, wherein in step (b) performing the transaction function results in a first transaction outcome, and wherein the template attributes associated with the at least one first document template selected in step (c) further correspond to the first transaction outcome.

12. The method according to claim 11, wherein the first transaction outcome corresponds to an incomplete transaction function, wherein in step (d) the indicia printed on the first document is representative of an incomplete transaction function.

13. The method according to claim 11, wherein the first transaction outcome corresponds to a denied transaction function, wherein step (d) includes printing indicia on the first document that is representative of the transaction function being denied.

14. The method according to claim 2, wherein the at least one first characteristic of the first printer device corresponds to a depository printer type characteristic, wherein in step (c) the at least one first document template corresponds to a deposit envelope print format, wherein the first document includes a deposit envelope, and wherein step (d) includes printing transaction indicia on the deposit envelope responsive to the deposit envelope print format.

15. The method according to claim 1, wherein the at least one first document template includes at least one destination instruction that specifies a first type of printer and a second type of printer, wherein in step (d) the first printer device corresponds to the first type of printer device, and further comprising:
  e) printing a second document with a second printer device responsive to the first transaction function and the at least one first document template, wherein the second printer device corresponds to the second type of printer device, wherein the second document includes indicia that is representative of information associated with the first transaction function.

16. The method according to claim 15 wherein in step (d) the first type of printer device is a receipt printer, and in step (e) the second type of printer device is a journal printer.

17. The method according to claim 1, wherein the at least one first document template includes at least one destination instruction that specifies a first type of printer and a display device, wherein in step (d) the first printer device corresponds to the first type of printer device, and further comprising:
  e) outputting through the display device visual indicia responsive to the at least one first document template.

18. The method according to claim 1, wherein the at least one first characteristic of the first printer device corresponds to a paper size characteristic, wherein in step (c) the at least one first document template corresponds to the paper size characteristic, and wherein step (d) includes printing indicia within an area on the first document that corresponds to the paper size characteristic.

19. The method according to claim 1, wherein in step (a) the template attributes of the plurality of document templates further corresponds to characteristics of users, wherein in step (c) the at least one first document template is further selected responsive to at least one first characteristic of the user.

20. The method according to claim 19, wherein in step (c) the template attributes associated with the at least one first document template correspond to the at least one first characteristic of the user.

21. The method according to claim 20, wherein step (b) includes reading account information from a card with a card reader of the machine, wherein the account information includes information representative of a financial institution associated with the user, wherein in step (c) the at least one first document template corresponds to the financial institution associated with the user.

22. Computer readable media bearing instructions which are operative to cause at least one computer in the machine to cause the machine to carry out the method steps recited in claim 1.

23. A method comprising:
  a) providing a plurality of document templates in operative connection with at least one computer associated with an automated banking machine, wherein each of the document templates is associated with a corresponding set of template attributes, wherein the template attributes of the plurality of document templates correspond to characteristics of transaction functions, wherein each of the plurality of document templates includes at least one destination instruction which specifies at least one type of printer device;
  b) performing a first transaction function with the automated banking machine responsive to at least one input to the machine from a user;
  c) selecting a first document template from the plurality of document templates through operation of the at least one computer responsive to at least one first characteristic of the first transaction function, wherein the first document template includes a destination instruction that corresponds to a first type of printer device; and
  d) printing a first document with a first printer device in connection with the machine responsive to the first transaction function and the first document template, wherein the first document includes indicia that is representative of information associated with the first transaction function, wherein the first printer device corresponds to the first type of printer device.

24. The method according to claim 23, wherein in step (c) the template attributes associated with the first document template correspond to the at least one first characteristic of the transaction function.

25. The method according to claim 24 wherein step (b) includes dispensing cash through operation of a cash dispenser of the machine, wherein the at least one first characteristic of the transaction function corresponds to a cash dispense transaction function type, wherein in step (c) the template attributes associated with the first document template further correspond to the cash dispense transaction function type, wherein in step (d) the indicia printed on the first document includes transaction indicia representative of an amount of cash dispensed by the machine.

26. The method according to claim 24, wherein in step (d) the first document template is associated with a plurality of tags, wherein the plurality of tags specify a format mask for the indicia printed on the first document.

27. The method according to claim 24, wherein in step (b) performing the transaction function results in a first transaction outcome, and wherein the template attributes associated with the first document template selected in step (c) further correspond to the first transaction outcome.

28. The method according to claim 27, wherein the first transaction outcome corresponds to an incomplete transaction function, wherein in step (d) the indicia printed on the first document is representative of an incomplete transaction function.

29. The method according to claim 24, wherein in step (a) the template attributes of the plurality of document templates further corresponds to characteristics of users, wherein in step (c) the first document template is further selected responsive to at least one first characteristic of the user.

30. The method according to claim 29, wherein in step (c) the template attributes associated with the first document template correspond to the at least one first characteristic of the user.

31. Computer readable media bearing instructions which are operative to cause at least one computer in the machine to cause the machine to carry out the method steps recited in claim 23.

32. A method comprising:
- a) providing a plurality of document templates in operative connection with at least one computer associated with an automated banking machine, wherein each of the document templates is associated with a corresponding set of template attributes, wherein the template attributes of the plurality of document templates correspond to characteristics of transaction functions and to characteristics of printer devices;
- b) performing a first transaction function with the automated banking machine responsive to at least one input to the machine from a user;
- c) selecting a first document template from the plurality of document templates through operation of the at least one computer responsive to at least one first characteristic of the first transaction function and at least one first characteristic of the first printer device; and
- d) printing a first document with a first printer device in connection with the machine responsive to the first transaction function and the first document template, wherein the first document includes indicia that is representative of information associated with the first transaction function.

33. The method according to claim 32, wherein in step (c) the at least one first characteristic of the first printer device corresponds to a paper size.

34. Computer readable media bearing instructions which are operative to cause at least one computer in the machine to cause the machine to carry out the method steps recited in claim 32.

35. A method comprising:
- a) providing a plurality of document templates in operative connection with at least one computer associated with an automated banking machine;
- b) performing a transaction function with the automated banking machine responsive to at least one input from an operator of the machine;
- c) selecting at least one document template from the plurality of document templates responsive to the transaction function, wherein the at least one document template includes at least one first destination instruction, wherein the at least one document template further includes first printing instructions which define first information to be printed by the machine, wherein the first printing instructions are associated with the first destination instruction, wherein the first destination instruction specifies printing to a first printer device and a second printer device responsive to the first printing instructions;
- d) printing a first document with the first printer device responsive to first printing instructions; and
- e) printing a second document with the second printer device responsive to the first printing instructions.

36. The method according to claim 35, wherein in step (c) the first information is representative of transaction information associated with the transaction function.

37. The method according to claim 36, wherein in step (c) the at least one document template includes at least one second destination instruction, wherein the at least one document template farther includes second printing instructions which define second information to be printed by the machine, wherein the second printing instructions are associated with the second destination instruction, wherein the second destination instruction specifies printing only to the first printer device responsive to the second printing instructions, and further comprising:
- (f) printing the first document with the first printer device responsive to the second printing instructions.

38. The method according to claim 37, wherein in step (c) the second information is representative of a marketing message.

39. The method according to claim 38, wherein in step (d) the first printer device includes a receipt printer, and wherein in step (d) the second printer device includes a journal printer.

40. Computer readable media bearing instructions which are operative to cause at least one computer in the machine to cause the machine to carry out the method steps recited in claim 35.

41. A method comprising:
- a) operatively connecting an ATM to a host banking system including a plurality of document templates, wherein each of the document templates is associated with a different set of template attributes, wherein the template attributes of the plurality of document templates correspond to characteristics of a plurality of printer devices, at least one of the printer devices being installed in operative connection with the ATM;
- b) performing a first transaction function with the ATM responsive to at least one input to the ATM from a user;
- c) receiving with the ATM, first instructions from the host banking system, wherein the first instructions were produced through operation of the host banking system responsive to information associated with the first transaction function and at least one first document template from the plurality of document templates, wherein the at least one first document template was selected through operation of the host banking system responsive to at least one first characteristic of a first printer device installed in operative connection with the ATM; and
- d) printing a first document with the first printer device responsive to the first transaction function and the first instructions, wherein the first document includes indicia that is representative of the information associated with the first transaction function.

42. Computer readable media bearing instructions which are operative to cause at least one computer in the ATM to cause the ATM to carry out the method steps recited in claim 41.

* * * * *